US012673441B2

(12) United States Patent
Bergstrand

(10) Patent No.: US 12,673,441 B2
(45) Date of Patent: Jul. 7, 2026

(54) HAND-HELD CUTTING DEVICE

(71) Applicant: ES Equipment Holding AB, Munkedal (SE)

(72) Inventor: Martin Bergstrand, Karlstad (SE)

(73) Assignee: ES EQUIPMENT HOLDING AB, Munkedal (SE)

( * ) Notice: Subject to any disclaimer, the term of this patent is extended or adjusted under 35 U.S.C. 154(b) by 109 days.

(21) Appl. No.: 18/615,454

(22) Filed: Mar. 25, 2024

(65) Prior Publication Data

US 2025/0296261 A1 Sep. 25, 2025

(51) Int. Cl.
*B26B 25/00* (2006.01)

(52) U.S. Cl.
CPC .................................. *B26B 25/005* (2013.01)

(58) Field of Classification Search
CPC ..... B26B 25/00; B26B 25/002; B26B 25/005; B26B 25/007; B26B 27/00
USPC ........................... 30/280–285, 292, 294, 319
See application file for complete search history.

(56) References Cited

U.S. PATENT DOCUMENTS

| | | | | |
|---|---|---|---|---|
| 2,537,287 | A | 1/1951 | Thomas | |
| 3,590,483 | A * | 7/1971 | Szczepanski | B26B 25/005 30/151 |
| 3,673,687 | A | 7/1972 | Phillips | |
| 6,327,783 | B1 * | 12/2001 | Ming | B26B 25/005 30/286 |
| 6,460,254 | B1 * | 10/2002 | Mori | B26B 29/02 30/286 |
| 7,415,915 | B2 * | 8/2008 | Parrish | B26D 7/2621 30/162 |
| 7,444,749 | B1 * | 11/2008 | Chen | B26B 25/005 30/317 |
| 7,624,507 | B2 | 12/2009 | Bergstrand | |
| 8,590,163 | B1 * | 11/2013 | Bagley | B26B 25/005 30/286 |
| 9,492,934 | B2 * | 11/2016 | Coffland | B26B 27/00 |
| 10,118,305 | B2 * | 11/2018 | Wright | B65B 69/0025 |
| 10,315,325 | B2 * | 6/2019 | Votolato | B26B 29/02 |
| 10,391,655 | B2 * | 8/2019 | Votolato | B26B 29/025 |
| 10,513,042 | B2 * | 12/2019 | Coffland | B65B 69/0025 |
| 10,850,413 | B2 * | 12/2020 | Mortensen | B26B 25/005 |

(Continued)

FOREIGN PATENT DOCUMENTS

SE 537056 12/2013

*Primary Examiner* — Boyer D Ashley
*Assistant Examiner* — Richard D Crosby, Jr.
(74) *Attorney, Agent, or Firm* — Jeffrey S. Melcher; Melcher Patent Law PLLC

(57) ABSTRACT

A hand-held cutting device having a main body (6) including a handle (62) and a cutting head (63). The cutting device having a cutting element (4) attached to the cutting head (63), a guiding and supporting element (2) extending from the cutting head (63). The guiding and supporting element (2) and cutting head (63) being arranged to form a protecting periphery such that any part of a cutting edge (4A) of the cutting element (4) does not protrude outside of the periphery. The guiding and supporting element (2) including a distal portion (20) arranged to form a feed channel (64) together with a portion (60) of the handle (62), and the cutting element (4) is arranged to be releasably, none rotatably, attached to the cutting head (63), by means of a locking device (42, 43) that provides for re-positioning and renewing of an active part of the cutting edge (4A).

11 Claims, 1 Drawing Sheet

(56) References Cited

U.S. PATENT DOCUMENTS

| | | | | |
|---|---|---|---|---|
| 12,226,924 | B2 * | 2/2025 | Wayment | B26B 25/005 |
| 2006/0150426 | A1 * | 7/2006 | Okada | B26B 25/005 30/286 |
| 2007/0028461 | A1 * | 2/2007 | Chen Lin | B26B 25/005 30/319 |
| 2008/0155838 | A1 * | 7/2008 | Bergstrand | B26B 25/005 30/294 |
| 2009/0183378 | A1 * | 7/2009 | Eby | B26B 25/005 30/391 |
| 2010/0101098 | A1 * | 4/2010 | Hsu | B26D 1/185 30/319 |
| 2011/0192034 | A1 * | 8/2011 | Holcomb | B26B 25/005 30/286 |
| 2021/0370533 | A1 * | 12/2021 | Bader | B26B 17/02 |

* cited by examiner

HAND-HELD CUTTING DEVICE

FIELD OF THE INVENTION

The present invention relates to a hand held cutting device, comprising a main body which comprises a handle and a cutting head, further the cutting device comprises a cutting element attached to said cutting head, a guiding and supporting element extending from said cutting head, said guiding and supporting element and cutting head being arranged to form a protecting periphery such that any part of a cutting edge of said cutting element does not protrude outside of said periphery, said guiding and supporting element including a distal portion arranged to form a feed channel together with a portion of said handle and a support device arranged on said guiding and supporting element, which support device is arranged to interact with said cutting edge to improve cutability, and said cutting element is arranged to be none rotatably, fixedly attached to said cutting head, by means of a locking device that provides for re-positioning and thereby renewing of said cutting edge.

BACKGROUND INFORMATION

In accident situations with a suspected injury, it could be very important to liberate a victim of the accident from his clothes for diagnosis purposes or instantaneous treatment. Additionally, when there is e.g. exposure to dangerous chemicals it could also be very important to liberate the victim from his clothes if they have been soaked with such chemicals.

Also in other applications and situations there are of great importance to quickly release someone or something. For example, horsemen need to fast and safely cut a horse loose when the horse is in panic or in an easy way cut a horse loose from a snaffle, a halter, a girth for example when nailed in e.g. a wire fence.

Even in other cutting situations there are a need for a safe and easy cutting tool e.g. when cutting rugs, carpets, mats, and other fabrics and work pieces as well. In the sport environment there is also a need for quickly removing e.g. tape and bandages. Another use is for rapid severing of a safety or seat belt of a motor vehicle to release a passenger there from in the event of an emergency.

Cutting devices for one or the other of the above-mentioned purposes are previously known. U.S. Pat. No. 4,631,829 for instance describes a holder for a conventional single-edge razor blade used to cut thin, elongated articles. The cutting edge of the blade is protected except for a portion thereof, which is exposed at the end of a guide slot in the holder. The blade is replaceable without tools and is reversible to use portions of both ends. One of the disadvantages of this holder is that the blade has to be dismounted when shifting to a new edge on the same blade. Additionally, there is only two possible positions for the blade which gives only two fresh independent cutting edges per blade.

Another similar cutting device is known from U.S. Pat. No. 2,537,287. Also in this device the blade is replaceable without tools and is reversible to use portions of both ends. The disadvantages of this device of the same as listed above.

The patent specification U.S. Pat. No. 3,673,687 describes a bandage cutter and more particularly the cutter for removing the tape that is routinely applied to the wrists and ankles of athletes. This cutting device is provided with a cutting element of special and complicated design. The cutting element can be dismounted without using any tools but there is no possibility to shift the position of the element in order to expose and new fresh portion of the cutting edge.

U.S. Pat. No. 7,624,507 and SE-C-537056 describe a handheld cutting device developed by the applicant which is adapted for cutting textile material of different types, particularly cutting off clothes of a victim of an accident. The cutting device has a design that makes the use of the cutting device safe for both the user and the victim. The cutting element may be rotated to provide the cutting device with a new edge on the cutting element or be replaced without using any tools.

From the prior art there is also known a cutting device having a cutting element in the form of a free rotating circular disc which co-operates with an opposed free roller fixed on a pivoting arm. By means of an adjustment mechanism the position of said arm and thereby the roller in relation to the cutting element can be set. The work piece to be cut passes between the cutting element and the roller. An essential disadvantage with this device is of course the complicated design with several moving elements and adjustment needs. Additionally, the efficiency of the device is poor due to the rotating movement of the cutting element.

SUMMARY OF THE INVENTION

One object of the invention is to provide a cutting device having at least three, preferably at least five possible positions for the associated cutting element, that in an easily and safely manoeuvred manner may provide fresh independent cutting edges and which may be cost-efficiently provided, which is achieved by a handheld cutting device, comprising a main body (6) which comprises a handle (62) and a cutting head (63), further the cutting device comprises a cutting element (4) attached to said cutting head (63), a guiding and supporting element (2) extending from said cutting head (63), said guiding and supporting element (2) and cutting head (63) being arranged to form a protecting periphery such that any part of a cutting edge (4A) of said cutting element (4) does not protrude outside of said periphery, said guiding and supporting element (2) including a distal portion (20) arranged to form a feed channel (64) together with a portion (60) of said handle (62), and said cutting element (4) is arranged to be releasably, none rotatably, attached to said cutting head (63), by means of a locking device (42, 43) that provides for re-positioning and thereby renewing of an active part of said cutting edge (4A), where in said locking device (42, 43) is arranged to cooperate with a repositioning arrangement (8, 9) including a pointing member (92) and said cutting head (63) includes a plurality of position markings (93), wherein by means of locking members (81, 83, 90, 44) said pointing member (92) is arranged to rotate together with said cutting member (4) arranged to visualise by means of interaction with one of said markings (93) which part of the cutting edge (4A) is active.

BRIEF DESCRIPTION OF THE DRAWINGS

Objects, uses and advantages of this invention will be apparent from the reading of this description which proceeds with reference to the accompanying drawings forming part thereof and wherein.

DETAILED DESCRIPTION OF THE INVENTION

The following detailed description, and the examples contained therein, are provided for the purpose of describing and illustrating certain embodiments of the invention only and are not intended to limit the scope of the invention in any way.

Figure 1:
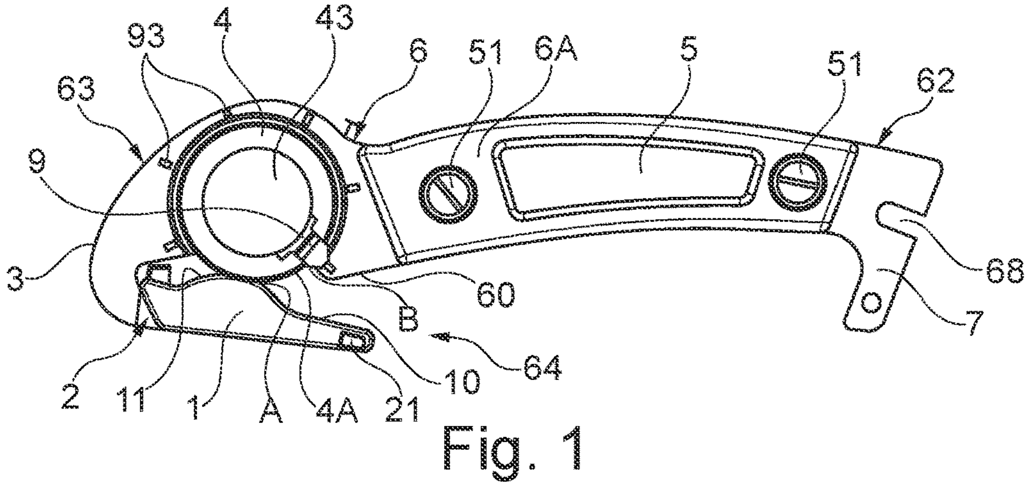
FIG. 1 shows a side view of a preferred embodiment of the cutting device according to the invention.

FIG. 1 shows a side view of a preferred embodiment of a cutting device according to the invention.

The cutting device according to the invention comprises a main body 6 integrating a handle 62 and a cutting head 63 extending from the front end of the handle. At the rear end of the handle a glide stop 7 is arranged at the underside for making the grip more secure when pulling. Further, there may be arranged a tool device 68, e.g. a recess fitting a ridge (not shown) of a valve shaft. The handle 62 is preferably partly formed by the main body 6 and partly by gripping parts 6A, 6B. The main 6 is preferably made in a stronger material than the gripping parts 6A, 6B, which preferably are form moulded. The main body 6 is preferably made of a strong rigid material such as aluminium, brass, steel, plastic, especially reinforced plastic like e.g. carbon reinforced plastic resin or the like. The two gripping parts 6A, 6B are preferably attached by means of screws 51 (see FIG. 2) with cooperating internal threads 52 in one 6B of the gripping parts. A preferred and cost-effective way to manufacture the main body 6 is to cut out by means of laser or punch out the body from a metal sheet and/or by machining. The gripping parts 6A, 6B provide an elongated hole 5 in the handle 62, the main body 6 is arranged with a recess 69 that matches the upper contour of the elongated hole 5 of the gripping tool parts 6A, 6B.

The active part of the device is the cutting head 63 provided with a thin cutting element 4 made of stainless steel, ceramics or the like, arranged. The cutting element 4 is in the cutting procedure co-operating with an associated support and guiding element 2 which reaches from the front end 3 of the cutter underneath the cutting element 4 in the direction of the handle 62. In the preferred embodiment the support and guiding element 2 is fixedly attached to the cutting head 63, preferably by being integral with the main body 6 of the cutting head 63.

The cutting element 4 which in the appended drawings has a circular form (a generally available standard element that may be obtained to a low price) but of course the cutting element 4 could as a matter of fact have a number of other suitable forms. However, a general principle is to arrange the cutting element 4 attached to said cutting head 63 and having the guiding and supporting element 2 to form a protecting periphery such that any part of a cutting edge 4A of said cutting element 4 does not protrude outside of said periphery.

In the embodiment illustrated in FIG. 1 the active exposed cutting edge 4A or cutting zone between points of intersection A and B expose a periphery of the circular cutting element 4, related to a sector having an angle of a maximum of about 60 degrees. This means that the periphery of the cutting element 4 in this case comprises at least additionally five portions of the cutting edge 4A which can be shifted into active position between the points A and B when the previous one has become dull. It is an advantage of the invention that the shift to a new sharp cutting edge can be made without dismounting the cutting element 4 from the cutting head 63 which of course reduces the risk of injuries to the operator or damages to the cutting element/blade 4 itself. As will be described further on, the shift requires no tool to be carried out.

Figure 2:
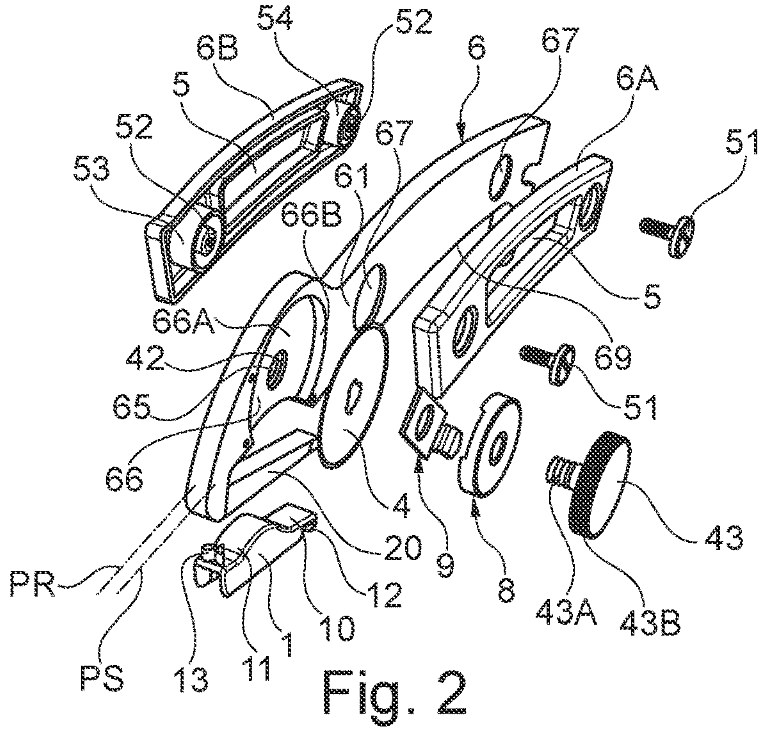
FIG. 2 shows an exploded, perspective view of the same embodiment of the invention.
Figure 3:
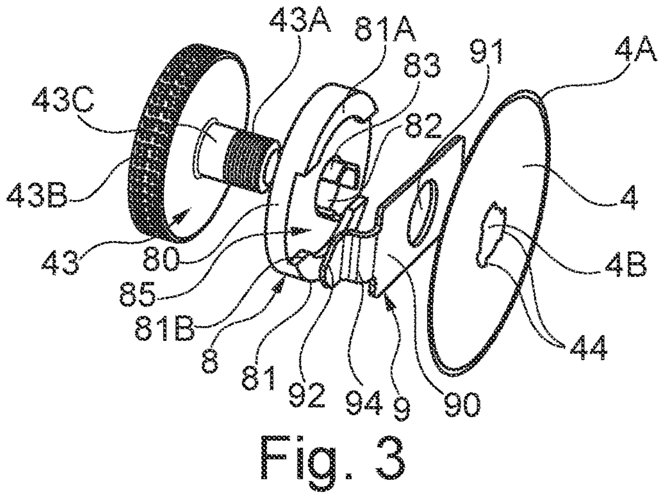
FIG. 3 shows a perspective, exploded view of the cutting head according to a preferred embodiment of the invention.

As shown in FIG. 2, approximately at the centre of the cutting head 63 the main body 6 is provided with a through hole 65, see FIG. 2, co-operating with a locking device 42, 43 comprising a fixing screw 43 having a threaded portion 43A, a stub part 43C and a knurled head 43B with a relatively large diameter to make it easy to handle, see FIG. 3. The hole 65 is arranged with an internal thread 42 that co-operates with said threaded portion 43A of the fixing screw, such that the fixing screw 43may be introduced into the through hole 65 and tightened to fixate the cutting element 4.

Further, FIG. 2 shows that there is arranged a recess 66 within the cutting head 63, for housing the cutting element 4, wherein the hole 65 with the internal thread 42 is positioned centrally. Thanks to the recess 66 having a depth substantially larger than the cutting element 4 the cutting element 4 will be securely protected (minimizing risk for user to be cut and risk of damaging cutting edge) within the recess 66, which has a peripheral surface 66B with a diameter that is larger than the diameter of the cutting element 4. It is also shown that there is arranged a repositioning arrangement 8, 9.

In the preferred embodiment the repositioning arrangement 8, 9 comprises two parts, a fixation element 8 and a pointing element 9. The fixation element 8 has a clamping and fixing function, respectively. The fixing function relates to non-rotatably fixation of the pointing element 9 and the cutting element 4. The clamping function relates to clamping of the cutting element 4 against a bottom surface 66A of the cutting element 4 within the recess 66. The design of repositioning arrangement 8, 9 in combination with the recess 66 provides the advantage that there is no risk (or at least minimized risk) of getting cut when repositioning the cutting element 4, as will be evident by the detailed described below.

The fixation element 8 has a substantially circular body 80 having fixation members 81 protruding in an axial direction on one side of the body 80. The fixation members 81 comprise two semi-circular segments that are positioned diametrically in relation to each other and symmetrically in relation to a through hole 82 through the body 80. The segments 81 protrude in a manner to form a passage 85 by means of inner side surfaces 81B of the protruding segments 81, such that the surfaces 81B of the protruding elements 81 delimit said passage 85 for holding a body 90 of the pointing element 9 in a non-rotatable manner. Further, the fixation members 81 have axially facing surfaces 81A that may transmit clamping force onto the cutting element 4, when clamping force is applied by means of the fixing screw 43.

Moreover, the fixation element 8 has a plurality of locking members 83 protruding on the same side as the fixation members 81, which locking members 83 are in the form of thin protruding teeth that match with corresponding indentations 44 in the outer periphery of a central hole 4B of the cutting element 4. When the locking members 83 are introduced into the indentations 44 of the hole 4B of the cutting element 4, the fixation element 8 and the cutting element 4 will be non-rotatably connected to each other.

The pointing element 9 comprises of a holding body 90 having a through hole 91 that is sufficiently large to allow the locking members 83 to pass through, such that the locking members 83 may pass through the hole 91 of the holding body 90 into the indentations 44 of the locking element.

Furthermore, the pointing element 9 is arranged with a pointing member 92 which extends further than the outer periphery 66B of the recess, when the pointing element 9 is positioned onto the stub 43C of the fixing screw 43. Moreover, there is an intermediate portion 94 in between the holding body 90 and the pointing member 92 that enables the pointing member 92 to be located out of the recess 66 on top of the surface 61 of the main body. Accordingly, the fixation element 8 and the pointing element 9 will rotate together with the cutting element 4 when rotation of the cutting element is provided, e-g- to renew the cutting edge 4A. Such rotation may be easily performed when the fixing screw 43 is loosened such that the clamping force is taken away whereby the pointing member 92 may easily be pushed to rotate the cutting element 4, for repositioning to activate a new cutting edge 4A.

The depth of the peripheral surface 66B of the recess is preferably larger than or equal to the accumulated height of the cutting element 4, the fixing element 8 and the holding body 90, wherein preferably the height of the holding body 90 is equal to or less than the height of the protruding segments 81of the fixing element 8.

In order to easily readjust the cutting surface 4A into an appropriate new position there are markings 93, preferably integrated in the surface 61 of the main body 6, arranged around at the outside of the recess 66 such that the pointing member 92 will easily visually/signalize an appropriate new position of the cutting element 4.

The associated support and guiding element 2 preferably has a core in the form of an elongated member 20 forming an integral part of the main body 6 and which as mentioned reaches from the front end 3 of the cutter underneath the cutting element 4 in the direction of the handle 62. This part has advantageously the form of a wedge with the tip forming the distal end in the direction of the handle 62. The support and guiding element 2 together with the cutting element 4 and the lower front part 60 of the handle will define a feed channel 64 having its opening in the direction of the handle for directing and feeding the work piece towards the active part of the cutting element between the points A and B in FIG. 2.

The guiding and supporting element 2 is preferably provided with a removable sleeve 1, see for example FIG. 2, preferably made of a suitable plastic (e.g. POM or PTFE), that provides sufficiently low friction for a cloth or the like to easily slide across it. By sliding the sleeve 1 from the right to the left in the FIG. 1 on top of and over a core 20 of the guiding and supporting element 2, the sleeve 1 can be fixed to the latter. When mounting the sleeve 1 the cutting element 4 may already be fixed. The dimensions of the sleeve 1 is preferably such that the mounted cutting element 4 will cut a slit in an upper portion of the support sleeve 1 when pushed onto the core member, thereby supporting the cutting edge 4A sidewise and closing the feed channel 64 at the intersection at point A in FIG. 1. Thus, the shortest distance between the upper portion 1A of the support sleeve 1 and the centre of the mounted cutting element 4 is preferably less than the radius of the cutting element. This arrangement will also lock the sleeve 1 vertically.

In the illustrated embodiment of the invention the distal end of the core 20 of the guiding and supporting element 2 has been provided with a protrusion 21 cooperating with a recess 12 in the sleeve. This arrangement provides a snap-in function which will block the longitudinal movement of the sleeve 1 on the core 20 of the guiding and supporting element 2. However, the sleeve 1 may instead be locked in other manners, e.g. by clamping force. At use, the sleeve 1 will be repeatedly pushed in a downstream direction of the feeding channel 64 which will contribute to keep it in position and hence the protrusion 21 may be omitted.

It is clear that there is quite some freedom of design when it comes to the profile of the support surfaces 10 and 11 of the support sleeve 1, both in front of the cutting area, fore support surface 10, and behind the cutting area, aft support surface 11. This makes it possible to design the feed channel 64 to optimise the cutting characteristics of the cutting device for any particular material and environment. Thus, different sleeves for different jobs could be provided. In this context it is an advantage to form a straight-lined upper surface of the core 20 of the the guiding and supporting element 2 which provides for easy production and easy attachment (by sliding) of the support sleeve and to utilise the sleeve 1 (preferably being made of a cheaper material) to form desired surfaces 10, 11.

In the illustrated embodiment with a circular cutting element 4 the feed channel 64 has been made converging in a cutting portion of the feed channel 64 with successively decreasing cutting angle between the cutting edge 4A and the fore support surface 10 of the sleeve 1 in a direction towards the intersection between the two, i.e. point A in FIG. 1. The protruding portion 60 may act as a rest that may be supported at the surface of the material to be cut, e.g. paper board, thereby providing a proper position of the cutting tool during the cutting operation. In the cutting portion of the feed channel 64 the sleeve 1 is preferably provided with a portion presenting a smoothly curved surface, the fore support surface 10, that provides for a convergent zone of the feed channel 64, which may provide for easy and clog free feeding of material to be cut. The feed portion of the feed channel 64 may also be designed in order to provide good feeding and supporting properties for a large variety of work pieces, e.g. thickness, type of material. The width of the feeding channel 64 may be varied in order to provide different tilting ability by means of increasing the width of the support surfaces 10, 11.

In order to facilitate for the cut material to leave the cutting head in the direction to the left in FIG. 1 without risk of clogging the head, at a portion of the sleeve 1 may be provided with a divider 13 at the end of the aft support surface 11, after the cutting area. The divider 13, preferably comprising two walls, each having the form of a wedge pointing in the opposite direction of the feeding direction of the cut material. At the point of the wedge is arranged a slit between the two walls which forms a passage for the cutting element during mounting of the sleeve 1.

From the above description it is clear that the cutting device during active state does not comprises any actual moving parts.

The cutting element 4 which is almost entirely protected in the recess 66 can easily be repositioned in order to present a fresh active cutting edge between the positions A and B without dismounting the same. To reposition the cutting element 4 the screw 43, preferably with a knurled head 43A, is unscrewed until the cutting element 4 loses its clamping contact with the bottom surface 66A of the recess 66, such that the cutting element 4 may be rotated to a new position in which the screw 43 is again tightened. Thanks to the protruding pointing member 92 this may easily be achieved by means of pushing the pointing member 92 to rotate the cutting element 4 to a next/neighbouring marking 93, for repositioning to activate a new cutting edge 4A. A fresh cutting edge may in this way in a cost-efficient and easily handled manner be entered between the positions A and B.

In order to change the cutting element 4 as a whole it is only necessary to completely unscrew the screw 43. After removing the screw 43, the fixing element 8 and the pointing element 9 the cutting element 4 may be taken out.

As shown in FIG. 1 the pointing element 9 may be interact with markings 93, such that the cutting element 4 may be repositioned in new active positions precisely defining new active, successive sectors of the cutting edge 4A. In the preferred embodiment markers 93 are placed at a distance away from the peripheral edge 66B of the recess 66 marking desired positions around the recess 66, housing the cutting element 4, at regular intervals, e.g. along a circle having a larger diameter than the recess 66. around the element 4 co-operating with a protruding from the pointing element 8. Each position of the pointer element 92 pointing at a new marking 94 will in this way correspond to a particular one of the cutting sectors with a new cutting edge 4A presented between the positions A and B in FIG. 1. With the geometries given in e.g. FIG. 1 this embodiment could e.g. have six markings 93 co-operating with the pointer 92 for shifting between six successive cutting edge sectors.

The invention is not delimited to what has been described above but may be varied within the scope of the appended claims. Hence the skilled person realises that many modifications may be performed regarding many of the features described above, e.g. using different kind of suitable materials, changing some dimension, but still achieve basically the same functionality. For instance, it is evident that a cutting device according to the invention may be very efficient to cut skin/fur (e.g. for a hunter) and also much safer than the use of a traditional knife.

The invention claimed is:

1. A handheld cutting device, comprising:

a main body which comprises a handle and a cutting head;

a cutting element attached to said cutting head;

the cutting element comprising a cutting edge having a circular shape and a central hole;

a guiding and supporting element extending from said cutting head;

said guiding and supporting element and cutting head being arranged to form a protecting periphery such that any part of the cutting edge of said cutting element does not protrude outside of said periphery;

said guiding and supporting element including a distal portion arranged to form a feed channel together with a portion of said handle;

said cutting element is releasably attached to said cutting head by a locking device, wherein in a locked position the cutting element is non-rotatable and in an unlocked position the cutting element is rotatable to provide for re-positioning and thereby renewing of an active part of said cutting edge;

said locking device is arranged to cooperate with a repositioning arrangement including a pointing member;

said cutting head includes a plurality of position markings;

locking members arranged to rotate said pointing member together with said cutting member to visualise by interaction with one of said markings which part of the cutting edge is active for cutting; and said locking device comprises a releasable fixing screw co-operating with a threaded part attached to said main body, which threaded part is centrally positioned within a recess within said cutting head, the fixing screw having a threaded portion and non-threaded portion, when the threaded portion is within the threaded part the non-threaded portion is within the hole of the cutting element locking the cutting element in the locked position.

2. The handheld cutting device according to claim 1, wherein said cutting element is positioned within a recess at a level below a plane (PS) including a surface of the main body.

3. The handheld cutting device according to claim 2, wherein said pointing member protrudes outside of the peripheral surface of said recess.

4. The handheld cutting device according to claim 3, wherein said pointing member extends adjacent said plane (PS) including said surface and said holding body extends adjacent a different plane (PR) in level with the bottom surface of said recess.

5. The handheld cutting device according to claim 1, wherein said locking device comprises a releasable fixing screw co-operating with a threaded part attached to, said main body, which threaded part is centrally positioned within a recess within said cutting head.

6. The handheld cutting device according to claim 1, wherein said repositioning arrangement includes a fixation element having a first fixation arrangement arranged to releasably, non-rotatably hold a holding body of a pointing element carrying said pointing member and having a second fixation arrangement arranged to releasably, non-rotatably hold said cutting element.

7. The handheld cutting device according to claim 6, wherein said fixation element is provided with at least one surface arranged to transmit a clamping force from said fixing screw to said cutting element against a bottom surface of said recess.

8. The handheld cutting device according to claim 7, wherein said first fixation arrangement includes said at least one surface.

9. The handheld cutting device according to claim 6, wherein second fixation arrangement comprises at least one axially protruding device arranged to interact with an indentation arranged within said cutting element.

10. The handheld cutting device according to claim 6, wherein said pointing member extends adjacent said plane (PS) including said surface and said holding body extends adjacent a different plane (PR) in level with the bottom surface of said recess.

11. The handheld device according to claim 1, wherein a support device is arranged on said guiding and supporting element, which support device is arranged to interact with said cutting edge to improve cutability and wherein said support device is arranged with an upper portion forming a fixed recess interacting with said cutting edge.

* * * * *